UNITED STATES PATENT OFFICE.

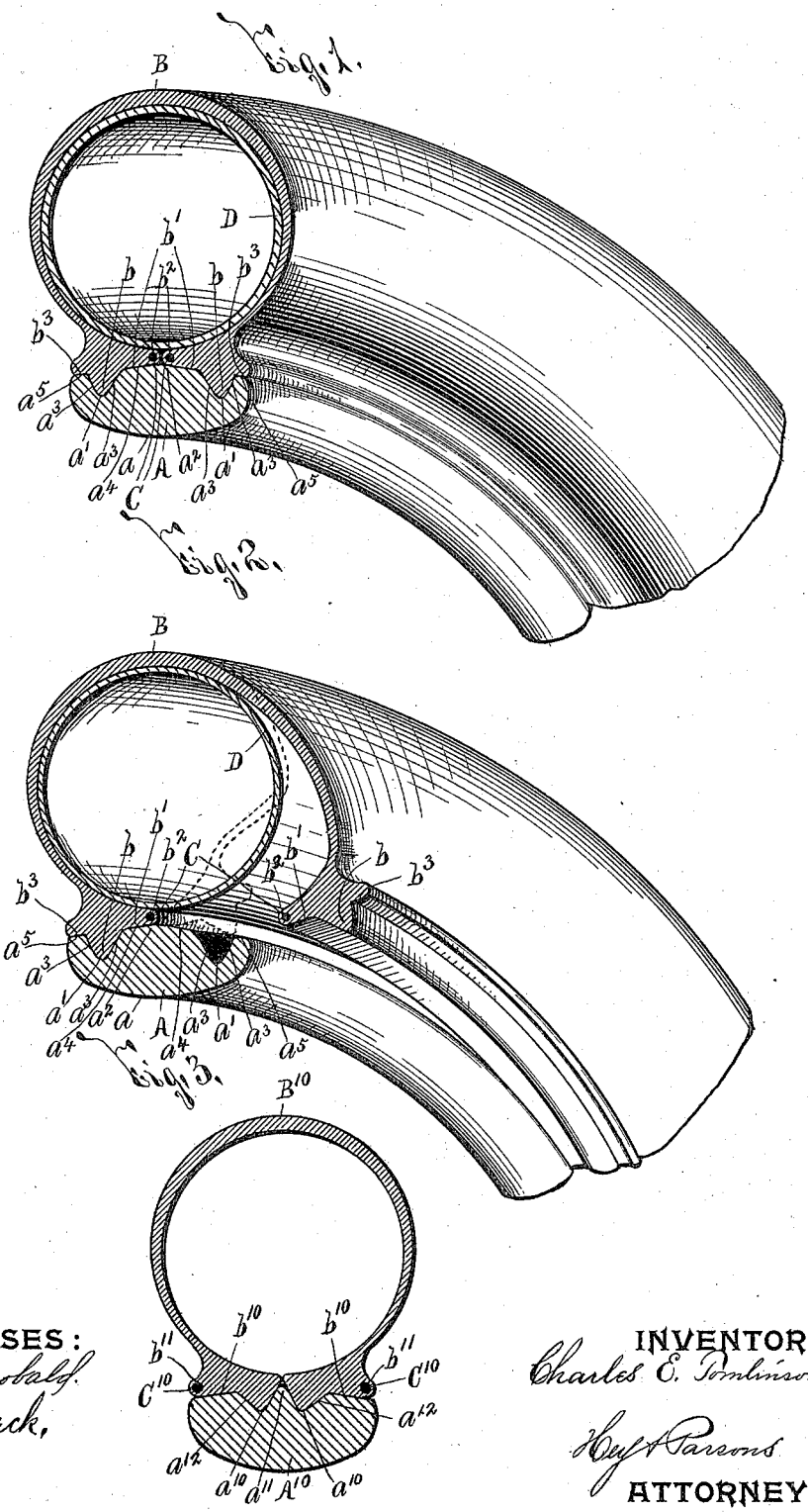

CHARLES E. TOMLINSON, OF SYRACUSE, NEW YORK, ASSIGNOR TO IRVING A. WESTON, OF SAME PLACE.

VEHICLE-WHEEL.

SPECIFICATION forming part of Letters Patent No. 579,309, dated March 23, 1897.

Application filed April 16, 1895. Serial No. 545,859. (No model.)

*To all whom it may concern:*

Be it known that I, CHARLES E. TOMLINSON, of Syracuse, in the county of Onondaga, in the State of New York, have invented new and useful Improvements in Vehicle-Wheels, of which the following, taken in connection with the accompanying drawings, is a full, clear, and exact description.

My invention relates to improvements in vehicle-wheels, and has for its object the production of a practical and effective device for firmly securing a tire to a wheel-rim and permitting easy removal of the tire; and to this end it consists, essentially, in the general construction and arrangement of the component parts of the rim and tire, all as hereinafter more particularly described, and pointed out in the claims.

In describing this invention reference is had to the accompanying drawings, forming a part of this specification, in which like letters indicate corresponding parts in all the views.

Figure 1 is an isometric view of a transverse section of a wheel-rim and a tire constructed in accordance with my invention, the parts being shown in their normal position. Fig. 2 is a similar view illustrating in full lines a portion of the tire edge as removed and in dotted lines as partly removed, and Fig. 3 is a transverse section of a slightly-modified construction of my invention.

A represents the rim; B, the tire; C, the fastening strip or band, and D an inflatable tube within the tire. The rim A is illustrated as composed of wood, but may be formed of sheet or rolled metal or other suitable material, if desired. Its face $a$ nearest its axis is preferably formed convex, and its opposite face is provided with an annular groove or grooves $a'$ $a'$ and a substantially central rib $a^2$. The grooves $a'$ $a'$ are here shown as provided at their outer and inner sides with engaging shoulders $a^3$, diverging from their edges, of less diameter; but these shoulders may be otherwise arranged.

Indeed, if desired, the outer sides of the grooves $a'$ $a'$ may be inclined toward each other from their edges nearest the axis of the rim, and the inner sides of said grooves may be considerably inclined, so that their adjacent edges would be in close proximity. An annular peripheral bearing-surface $a^4$ is disposed at one side and preferably the inner side of the adjacent groove $a'$. These bearing-surfaces usually form the outer face of the rib $a^2$ and preferably increase in diameter from their outer edges, but they may be otherwise disposed and formed, if desired; and it will be understood that when they form the outer face of the rib $a^2$ and increase in diameter from their outer edges the central portion of the outer face of said rib is of somewhat greater diameter than the edges of the adjacent shoulders $a^3$. When the bearing-surfaces $a^4$ are disposed as described, the rim A is preferably formed with annular bearing-surfaces $a^5$, which preferably increase in diameter from their outer edges and are arranged at the outer sides of the grooves $a'$ $a'$ for forming additional bearing-surfaces for the tire presently described.

The tire B is preferably crescent shape, and its edges are more or less thickened and are provided with shoulders $b$ $b$, arranged normally in the grooves $a'$ $a'$, and preferably engaged with the inner and outer shoulders $a^3$ of said grooves. Each edge of the tire B is also formed with a bearing-face $b'$, which usually increases in diameter from its outer edge, is disposed at one side, and preferably the inner side of the adjacent shoulder $b$, and encircles the corresponding surface $a^4$ of the rim A. The portions of the tire edges adjacent to the bearing-surfaces $b'$ $b'$ are also formed with annular eyes $b^2$, encircling the bearing-surfaces $a^4$ of the rim A. When the tire is formed with bearing-surfaces $b'$, disposed at the inner sides of the shoulders $b$ $b$, said tire is usually provided with outer bearing-surfaces $b^3$, which increase in diameter from their outer edges and engage the corresponding surfaces $a^5$ of the rim A.

The annular strips C C for securing the tire to the rim are arranged within the eyes $b^2$, and preferably consist of a wire, a cord, or other suitable device. The strips C are usually non-extensible longitudinally, and preferably consist of continuous bands loosely mounted in the eyes $b^2$, but may obviously be fixed to the walls of the eyes, or consist of segments suitably connected. The edges of the tire are free to swing inwardly or outwardly upon the strips or bands C for permitting engagement or disengagement of the shoulders $b'$ $a^3$. After the disengagement of the shoulders $b$ $a^3$, as indicated by dotted lines, Fig. 2, the tire edge may be readily withdrawn laterally from the edge of the rim, as seen by full lines at Fig. 2. The removal and securement of the tire edges are thus easily effected, although the tire is firmly held in its operative position. I have here illustrated both edges of the tire as secured by a fastening strip or band C, but it is obvious that one edge thereof may be fastened by any suitable means, as cement, well known to those skilled in the art, and its other edge provided with a fastening strip or band, as illustrated and described.

The inflatable tube D, which I preferably support within the tire B, is of any desirable form, size, and construction; but it is evident that it may be dispensed with, if desired. This tube is readily removed for examination, repair, or replacement when the tire edge is removed, as previously described, and said tube and the tire edge are readily replaced in their normal position.

At Fig. 3 I have shown a rim $A^{10}$, formed with grooves $a^{10}$, arranged in close proximity and separated by a narrow rib $a^{11}$. With this construction of rib annular bearing-surfaces $a^{12}$ for the tire $B^{10}$ are disposed at the outer sides of the grooves $a^{10}$, and the tire $B^{10}$ is provided with encircling bearing-surfaces $b^{10}$ and eyes $b^{11}$, in which fastening strips or bands $C^{10}$ are arranged. It will be apparent, however, to one skilled in the art that this is no material departure from my invention, as the strips or bands for securing the tire to the rim may obviously be disposed at the inner sides of the grooves $a'$ $a'$, as illustrated at Figs. 1 and 2, or at the outer sides of said grooves, as illustrated at Fig. 3.

The operation of my invention will be readily understood upon reference to the accompanying drawings and the foregoing description, and it will be evident that the tire is firmly held in position and is easily removed.

Having thus fully described my invention, what I claim as new, and desire to secure by Letters Patent, is—

1. The combination of a wheel-rim having its outer face provided with a peripheral bearing-surface and an annular groove arranged at one side of said bearing-surface and extending inwardly therefrom, a tire provided with a bearing-face arranged at one side of the annular groove of the rim and engaged with said bearing-surface and a shoulder mounted in the groove, and a substantially non-extensible strip secured to the tire at one side of said groove and shoulder and encircling said bearing surface and face whereby the tire swings on said strip, substantially as and for the purpose described.

2. The combination of a wheel-rim having its outer face provided with a peripheral bearing-surface and a groove disposed at one side of said surface and formed with an engaging shoulder, a tire provided with a shoulder arranged in the groove and engaged with the former shoulder, and a substantially non-extensible band secured to the tire and encircling the peripheral bearing-surface, whereby the tire swings on said strip, substantially as and for the purpose specified.

3. The combination of a wheel-rim A having its outer face provided with a peripheral bearing-surface $a^4$ and an annular groove $a'$ arranged at one side of said bearing-surface and extending inwardly therefrom, a tire B provided with a bearing-face $b'$ arranged at one side of the annular groove $a'$ and engaged with the bearing-surface $a^4$, a shoulder $b$ mounted in the groove $a'$, and an eye $b^2$ arranged at one side of said groove and shoulder and encircling said bearing surface and face, and a substantially non-extensible strip within the eye whereby the tire swings on said strip, substantially as and for the purpose specified.

4. The combination of a wheel-rim having its outer face provided with separated grooves formed with engaging shoulders, and peripheral bearing-surfaces disposed at opposite sides of the grooves and increasing in diameter from their outer side edges, a tire provided with shoulders arranged in the grooves, peripheral bearing-surfaces disposed at opposite sides of the shoulders and increasing in diameter from their outer side edges for engaging the former bearing-surfaces, and annular eyes disposed at the outer sides of the shoulders, and annular bands arranged in the eyes whereby the tire edges swing on said bands, substantially as and for the purpose set forth.

In testimony whereof I have hereunto signed my name, in the presence of two attesting witnesses, at Syracuse, in the county of Onondaga, in the State of New York, this 3d day of April, 1895.

CHARLES E. TOMLINSON.

Witnesses:
E. A. WEISBURG,
K. H. THEOBALD.